United States Patent
Zaharris et al.

(10) Patent No.: US 6,738,333 B1
(45) Date of Patent: May 18, 2004

(54) FORMAT FOR RECORDING DATA IN A STORAGE DISK

(75) Inventors: Daniel R. Zaharris, Longmont, CO (US); Lane W. Lee, Lafayette, CO (US); Stanton M. Keeler, Longmont, CO (US); Michael B. Propps, Loveland, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 676 days.

(21) Appl. No.: 09/583,448

(22) Filed: May 30, 2000

(51) Int. Cl.$^7$ ............................................... G11B 27/36
(52) U.S. Cl. ................... 369/59.25; 369/275.3
(58) Field of Search ......................... 369/59.25, 275.3, 369/53.21, 111

(56) References Cited

U.S. PATENT DOCUMENTS

| | | | |
|---|---|---|---|
| 4,420,828 A | 12/1983 | Yoshida et al. | 369/47.49 |
| 4,791,627 A | 12/1988 | Yonezawa | 369/109 |
| 4,827,462 A | 5/1989 | Flannagan et al. | 369/32 |
| 4,866,692 A | 9/1989 | Saito et al. | 369/59 |
| 4,901,300 A | 2/1990 | Van Der Zande et al. | 369/47 |
| 4,960,680 A | 10/1990 | Pan et al. | 430/346 |
| 4,972,401 A | 11/1990 | Carasso et al. | 369/59 |
| 4,981,743 A | 1/1991 | Ho | 428/64 |
| 4,987,533 A | 1/1991 | Clark et al. | 364/200 |
| 5,023,854 A | 6/1991 | Satoh et al. | 369/32 |

(List continued on next page.)

FOREIGN PATENT DOCUMENTS

| | | | |
|---|---|---|---|
| EP | 0 284 037 | 3/1988 | G11B/27/28 |
| EP | 0 301 829 | 7/1988 | G11B/7/24 |
| EP | 0 301 866 | 7/1988 | G11B/23/00 |
| EP | 0 350 920 | 7/1989 | G11B/20/18 |
| EP | 0 386 971 | 3/1990 | G11B/7/26 |
| EP | 0 802 530 | 11/1990 | G11B/7/24 |
| EP | 0 448 378 | 3/1991 | G11B/7/007 |
| EP | 0 466 389 | 7/1991 | G06F/11/14 |
| EP | 0 475 197 | 8/1991 | G11B/7/24 |
| EP | 0 488 388 | 11/1991 | G11B/23/00 |

(List continued on next page.)

OTHER PUBLICATIONS

Patent Abstracts of Japan, vol. 010, No. 198 (P–476), Jul. 11, 1986, & JP 61 039987 A (Hitachi Ltd), Feb. 26, 1986, abstract.

(List continued on next page.)

*Primary Examiner*—Tan Dinh
*Assistant Examiner*—Kimlien Le
(74) *Attorney, Agent, or Firm*—MacPherson Kwok Chen & Heid LLP (57) ABSTRACT

A data storage disk includes a writeable area that allows a user to write data, wherein the data files are written from the outside diameter towards the inside diameter of the writeable area, while file system information is written from the inside diameter towards the outside diameter of the writeable area. This optimizes the use of the writeable area, whether a large number of small data files or a small number of large data files are being stored. To further optimize the use of the writeable area, information may be stored in two or more different error correction code (ECC) block sizes. Thus, information, such as the file system attributes and linking sectors, which contains few bytes may be stored in the smaller ECC block size, while the data may be stored in the larger ECC block size. The data storage disk, may also include a mastered content area.

18 Claims, 8 Drawing Sheets

U.S. PATENT DOCUMENTS

| | | | |
|---|---|---|---|
| 5,023,856 A | 6/1991 | Raaymakers et al. | 369/32 |
| 5,029,125 A | 7/1991 | Sciupac | 364/900 |
| 5,073,887 A | 12/1991 | Takagi et al. | 369/100 |
| 5,080,736 A | 1/1992 | Matsui | 156/64 |
| 5,113,512 A | 5/1992 | Miki et al. | 395/425 |
| 5,210,734 A | 5/1993 | Sakurai | 369/49 |
| 5,247,494 A | 9/1993 | Ohno et al. | 369/13 |
| 5,339,301 A | 8/1994 | Raaymakers et al. | 369/50 |
| 5,347,651 A | 9/1994 | Burke et al. | 395/600 |
| 5,377,178 A | 12/1994 | Saito et al. | 369/124 |
| 5,446,858 A | 8/1995 | Copeland et al. | |
| 5,448,728 A | 9/1995 | Takano et al. | 395/600 |
| 5,491,807 A | 2/1996 | Freeman et al. | 395/401 |
| 5,539,724 A | 7/1996 | Ohtomo | 369/275.4 |
| 5,654,947 A | 8/1997 | Roth et al. | 369/48 |
| 5,656,348 A * | 8/1997 | Kudo et al. | 428/64.1 |
| 5,677,953 A * | 10/1997 | Dolphin | 705/51 |
| 5,682,365 A | 10/1997 | Carasso et al. | 369/54 |
| 5,709,764 A | 1/1998 | Funawatari et al. | 156/275.7 |
| 5,754,351 A | 5/1998 | Kuen et al. | 360/48 |
| 5,774,440 A | 6/1998 | Kimura et al. | 369/59 |
| 5,787,460 A | 7/1998 | Yashiro et al. | 711/114 |
| 5,850,382 A | 12/1998 | Koishi et al. | 369/275.3 |
| 5,874,147 A | 2/1999 | Bojarczuk, Jr. et al. | 428/641 |
| 5,866,985 A | 3/1999 | Kobayashi et al. | 369/275.3 |
| 5,931,935 A | 8/1999 | Cabrera et al. | 710/260 |
| 5,978,812 A | 11/1999 | Inokuchi et al. | 707/200 |
| 5,999,504 A | 12/1999 | Aoki | 369/47 |
| 6,091,686 A * | 7/2000 | Caffarelli et al. | 369/53.24 |
| 6,117,185 A | 9/2000 | Schmidt | 717/9 |
| 6,125,100 A * | 9/2000 | Sensyu | 369/275.3 |
| 6,153,063 A | 11/2000 | Yamada et al. | 204/192.22 |
| 6,160,778 A | 12/2000 | Ito et al. | 369/54 |
| 6,243,340 B1 | 6/2001 | Ito et al. | 369/53.19 |
| 6,351,447 B1 | 2/2002 | Takagi et al. | 369/275.3 |
| 6,389,427 B1 | 5/2002 | Faulkner | 707/104.1 |
| 6,452,897 B1 * | 9/2002 | Van Den Enden | 369/275.1 |

FOREIGN PATENT DOCUMENTS

| | | | | |
|---|---|---|---|---|
| EP | 0 519 768 | | 5/1992 | G11B/7/00 |
| EP | 0 555 486 | | 8/1992 | G11B/23/00 |
| EP | 0 541 219 | | 9/1992 | G11B/20/12 |
| EP | 0 643 388 | * | 3/1995 | G11B/7/14 |
| EP | 0 676 764 | | 3/1995 | G11C/7/00 |
| EP | 0 718 827 | | 6/1995 | G11B/5/55 |
| EP | 0 730 274 | | 2/1996 | G11B/27/034 |
| EP | 0 786 767 | | 1/1997 | G11B/7/007 |
| EP | 0 969 452 | | 12/1997 | G11B/7/00 |
| EP | 0 840 296 | | 5/1998 | |
| EP | 0840296 | * | 5/1998 | G11B/7/007 |
| EP | 0 840 296 A3 | | 12/1998 | G11B/7/007 |
| GB | 2 203 886 | | 10/1988 | G11B/7/24 |
| GB | 2 322 555 | | 9/1998 | |
| WO | WO 00/72312 | | 11/2000 | |
| WO | WO 00/79526 | | 12/2000 | |
| WO | WO 01/06510 | | 1/2001 | G11B/20/18 |
| WO | WO 01/06511 | | 1/2001 | G11B/20/18 |
| WO | WO 01/93262 | | 12/2001 | G11B/20/00 |

OTHER PUBLICATIONS

ECMA: "Volume and File Structure of Read–Only and Write–Once Compact Disk Media for Information Interchange," Standard ECMA–168, [Online] No. $2^{nd}$ Ed, Dec. 1994, pp. 1–128, XP002183920, Geneva, CH, Retrieved from the Internet: <URL:http://www.ecma.ch/ecmal/STAND/ECMA–168.htm>.

Peterson, W. Wesley et al., "Error–Correcting Codes", The Massachusetts Institute of Technology, Second Edition (1991), pp. 222 and 223.

Couch, Leon W. II, "Digital and Analog Communication Systems", Macmillan Publishing Company, Third Edition (1990), pp. 497–508.

IBM Technocal Disclosure Bulletin, XP 002183288, "Defect Skipping Among Fixed Length Records in Direct Access Storage Devices", vol. 19, No. 4, Sep. 1976, pp. 1424–1426.

IBM Technical Disclosure Bulletin, XP 000588138, "Method, System and Interface for Mapping Tracks in No–ID Disk Drives", vol. 38, No. 12, Dec. 1995, pp. 275–277.

IBM Directory Maintenence VM/ESA, Diagnosis Reference, Jul. 1999, International Business Machines Corporation, Version 1, Release 5, p. 104.

ECMA: "120 mm DVD Rewritable Disk (DVD–RAM)", Standard ECMA–272, $2^{nd}$ Edition –Jun. 1999, pp. 1–99.

ECMA: "Data Interchange on 120 mm Optical Disk Using +RW Format –Capacity: 3,0 Gbytes and 6,0 Gbytes", Standard ECMA–274, $2^{nd}$ Edition –Jun. 1999, pp. 1–90.

ECMA: "80 mm (1,23 Gbytes per side) and 120 mn (3,95 Gbytes per side) DVD–Recordable Disk (DVD–R)", Standard ECMA–279, Dec. 1998. pp. 1–114, XP002183289.

Hewlett–Packard Company, "Safeguarding Data with WORM: Technologies, Processes, Legalities and Standards", 1999.

* cited by examiner

MANY SMALL FILES

FIG. 3A

FEW LARGE FILES

FORMAT FOR RECORDING DATA IN A STORAGE DISK

CROSS-REFERENCE TO RELATED APPLICATIONS

This application is related to the following U.S. patent applications: application Ser. No. 09/560,781, filed Apr. 28, 2000, entitled "Miniature Optical Disk For Data Storage"; application Ser. No. 09/542,681, filed Apr. 3, 2000, entitled "Structure And Method For Storing Data On Optical Disks"; application Ser. No. 09/583,133, filed concurrently herewith, entitled "Method And Apparatus For Emulating Read/Write File System On A Write Once Data Storage Disk"; and application Ser. No. 09/583,390, filed concurrently herewith, entitled "Defect Management System For A Storage Device", each of which applications is assigned to the assignee of this application, and each of which is hereby incorporated herein by reference in its entirety.

FIELD OF THE INVENTION

This invention relates to a format used for storing data in a memory storage disk and more specifically an optical storage disk. This invention also relates to an optical storage disk that contains both mastered and writeable areas.

BACKGROUND OF THE INVENTION

Data storage disks, and in particular optical data storage disks, are widely used for a number of purposes. For example, downloading data via computer networks such as the Internet onto data storage disks is becoming increasingly popular. The downloaded data may include movies, music recordings, books, and other media. There are different types and sizes of data storage disks available for storing and accessing the downloaded information.

A number of benefits can be achieved using a data storage disk which can economically provide both mastered information and the ability to write or record information. As used herein, "mastered information" refers to information in which content is incorporated (embossed) into the disk during the manufacture thereof. The information is typically represented by a series of pits or bumps in the reflective layer which alter the reflectivity of the layer and therefore can be detected by the read/write head as the track of pits or bumps passes beneath it. A common example of an optical disk is the well-known Compact Disc (CD), in which the information, normally music, is mastered prior to distribution.

A data storage device, e.g., a disk drive, which includes a read/write head is used to write information onto the disk and to read information from the disk. The disk drive is associated with a host device which uses the data read from the disk by the drive and which supplies data to be recorded by the disk drive onto the disk. A single host device may be coupled to more than one disk drive. Most prior art disk drives, including hard disk drives, floppy disk drives, and write once read many (WORM) disk drives (such as CD-R and DVD-R drives) are classified as "block level" devices. The drive itself simply reads or writes "blocks" of data pursuant to instructions from the host device, and is not concerned with the organization of the data blocks into files and directories.

Conventional storage disks assign specific areas for writing data files and for storing file system information or attributes (location, size, etc,) relating to the data files. This practice restricts the use of the disk. For example, a user who stores one large data file needs a relatively small area for storing file system information. In contrast, a user who stores numerous small data files requires proportionally more storage space for storing the file system information.

Conventional optical disk drives read and write data from an inner diameter ("ID") of the disk towards an outer diameter ("OD") of the disk and at a constant linear track velocity. The data may be stored in a single spiral track formed about the center of the disk and the disk rotated in an angular direction such that a read/write head following the track moves outward towards the OD of the disk. Alternatively, the data may be stored in concentric circular tracks, in which case the read/write head "jumps" outward to the next track after each rotation of the disk.

For example, a conventional CD has a first annular zone located near the ID of the disk that is reserved for a "table of contents" and a second annular zone located radially outward from the table of contents that is reserved for data. The data is written on a spiral track in a direction from the ID to the OD of the disk. Before any data can be read, the disk must be accelerated to a relatively high rotational velocity, using considerable power, so that the table of contents can be read. Moreover, if one or two very large files are recorded in the data zone, the table of contents area will remain unfilled. Conversely, if there are numerous small data files, the table of contents will fill up before the data zone. In either case, precious storage space is wasted.

In order to read the data at a constant linear track velocity, the storage disk must be rotated at a variable speed, e.g., more rapidly near the ID. Hence, more power is consumed in reading data at the ID than at the OD. In portable, battery-operated storage devices (for example, digital cameras, Palm Pilot™ personal digital assistants, and other similar devices), minimizing power consumption is critical to maximizing battery life. Moreover, the need to accelerate the disk to a relatively high rotational speed increases the amount of time required to access the data.

Conventional storage devices typically store data in fixed block sizes. For example, in DVD optical storage devices each block necessarily contains 32K bytes of data. This can be very wasteful of storage space. Writing a single check mark or fact, for example, normally does not require 32K bytes. Similarly, a "linking sector" containing timing information (described below) must precede the data written during each write session. Linking sectors do not require anywhere near 32K bytes of data. Moreover, file system information must also occupy 32K bytes. Allocating 32K bytes to system data relating to a single file can waste memory space. If, for example, the file or file system data contains only 100 bytes, almost the entire 32K bytes of storage capacity (i.e., 31.99K bytes) remains empty.

Accordingly, there is a need for a storage device and storage medium that is compact and portable, power-efficient, and capable of efficiently storing and transmitting large amounts of data regardless of the size of the individual data files.

SUMMARY OF THE INVENTION

A data storage disk in accordance with this invention comprises a writeable area which includes a servo track for guiding a write head. The writeable area includes a writeable system area adjacent an inner boundary of the writeable area; and a writeable data area adjacent an outer boundary of the writeable area. Typically, the writeable system area includes information (attributes) relating to data files stored in the writeable data area. There is no fixed boundary between the writeable system area and the writeable data area.

Initially, there is a blank area between the writeable system area and the writeable data area. As additional file system information is written on the inner diameter (ID) side of the blank area and additional data files are written on the outer diameter (OD) side of the blank area, the blank area shrinks in size. If additional file system information and additional data files continue to be written, ultimately the writeable system area and the writeable data area merge, and the blank area disappears. Whenever that happens, the writeable area will be fully utilized. No storage space will be wasted.

The invention also includes a method of writing data on a data storage disk having a writeable area comprising a writeable system area and a writeable data area, the writeable data area being located radially outward from the writeable system area, the writeable system area and the writeable data area being separated by a blank region. The method includes the steps of writing file system information in a first portion of the blank region located adjacent the writeable system area; and writing a data file in a second portion of the blank region located adjacent the writeable data area. The file system information includes an attribute of the data file. The file system information and data file are written in a direction from the OD of the storage device towards the ID of the storage device.

Writing file system information and data files in this way optimizes the usage of the writeable area, as compared with disk formats that have fixed areas reserved for file system information and data files, respectively, and wherein no additional data can be written once either the file system area or the data area is filled. In this case, there is normally storage space left in the other area and this space is wasted. In a disk formatted in accordance with this invention, the writeable system area and the writeable data area expand towards each other until finally they merge, at which point the entire writeable area is filled.

Using the disk format reduces the power consumption of the disk drive. As discussed above, in conventional systems data is written from ID to OD. In conventional constant linear velocity systems the rotational speed varies with the radius. Hence the rotational speed is the greatest when data is being read from or written near the ID, while the rotational speed is at a minimum when data is being read from or written near the OD. Since data is read from the ID to OD, a high rotational speed is generally required. In the format of this invention the storage device is not required to power up to the highest rotational speed before data may be read. Since lower rotational speed is required for reading data, the power consumption is less compared to conventional systems.

Besides saving power, a storage disk of this invention is available for reading or writing data earlier than conventional disks, i.e., the time for accessing data in the storage disk is reduced. Another advantage of the present invention is that the storage format is flexible. Based upon number and sizes of files, the data and file system zones of the writeable area may be used as necessary. Yet another advantage is that data can be written in plural block sizes rather than the fixed block sizes of conventional systems.

In another aspect, the invention comprises a method of writing data on a data storage disk having a writeable area, the writeable area comprising a first annular region of recorded information and a second annular region of recorded information, the second annular region being located radially outward from the first annular region and being separated from the first annular region by an annular blank area. The method comprises writing first information adjacent an outside edge of the first annular region and writing second information on the inside edge of the second annular region, thereby to reduce the size of the blank area.

In accordance with another aspect of the invention, the writeable area includes error correction code (ECC) blocks of different sizes, for example, a first plurality of ECC blocks of a first size and a second plurality of ECC blocks of a second size, the first size being smaller than the second size. This again increases the utilization of the writeable area, since data which typically occupies less storage space, such as file system attributes and linking sectors, can be written in the smaller ECC block size, resulting in less wasted storage space.

According to still another aspect, the invention comprises a data storage disk comprising a writeable area containing an unwritten servo track wherein a user may write data using a data storage device comprising a write head; and a mastered area containing data formed in conjunction with the manufacture of the disk; wherein the mastered area is located radially outside the writeable area. In many instances, the user will be reading the mastered data (e.g. a music video) and will not be writing data to the disk. In these instances, locating the mastered area radially outward from the writeable area tends to reduce the average rotational speed of a constant linear velocity device, thereby reducing power consumption and increasing the battery life of a portable device. In addition, locating the mastered data radially outward from the writeable area reduces the power consumed and time required in accessing the mastered data. The mastered data may written from the OD of the storage disk toward an ID of the storage disk. The data storage disk may also include a mastered file system zone, wherein the mastered file system zone includes file system objects that are written from the OD towards the ID of the data storage disk.

A more complete understanding of the invention can be obtained by reference to the following detailed description of the preferred embodiments thereof in connection with the following drawings.

BRIEF DESCRIPTION OF THE DRAWINGS

The use of similar reference numerals in different figures indicates similar or identical items. The drawings are not generally drawn to scale.

DESCRIPTION OF THE INVENTION

Figure 1:
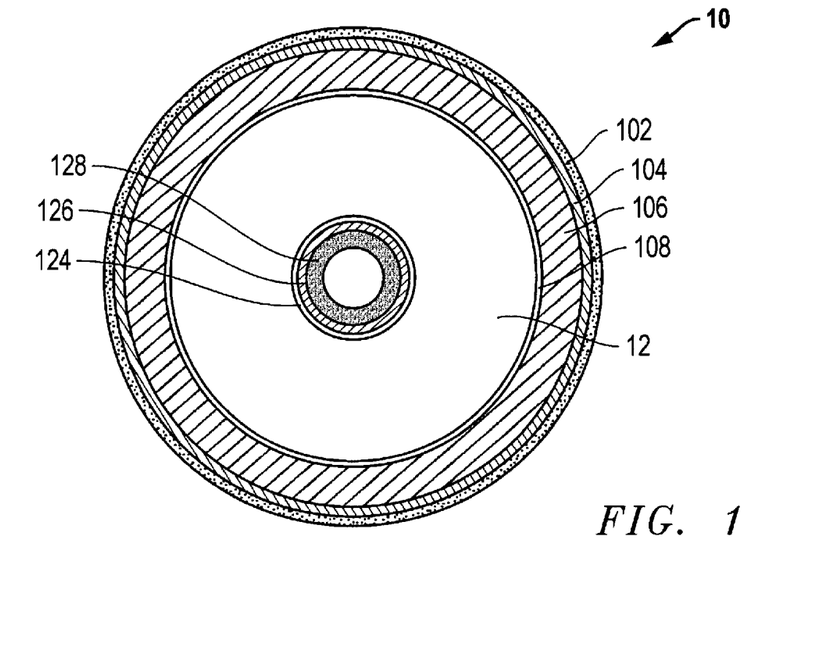
FIG. 1 illustrates a data storage disk with data stored in the format of this invention.

FIG. 1 shows one embodiment of a data storage disk 10 in accordance with this invention. In this embodiment, data storage disk 10 is an optical disk having at least one active layer composed of a phase-change optical material described in U.S. Pat. No. 4,960,680 to Pan et al., assigned to Eastman Kodak Company, which is incorporated herein by reference. Writing is performed on this material essentially by heating it with a laser beam, which causes it to change from an amorphous to a crystalline phase. The reflectivity of the amorphous and crystalline phases are different, allowing the changed areas to be read. Such disks are available from Kodak. This invention is not limited to disks in accordance with the above-referenced patent, however, and is applicable to a wide variety of data storage disks, including other types of optical disks, magneto-optic disk, and magnetic disks. One type of optical disk is described in the above-referenced U.S. Pat. No. 09/560,781.

Beginning at the outer diameter, data storage disk 10 includes a lead-in and disk system area (DSA) 102. The lead-in area is used to account for any mechanical tolerances, and for initial servo focus and tracking calibration. The disk system area includes the disk format characteristics (e.g., linear and radial density, scan velocity, laser wavelength, data block size), initial parameters for reading and writing data, and layout information for storage disk 10 (e.g., the starting sectors and sizes of the mastered and writeable areas). Also included in the disk system area is a "read channel calibration" area that is used to calibrate an optical read channel for a mastered area 106 (described below). The radius of the lead-in area of disk 10 could be 15.4 mm, for example.

Storage disk 10 also includes a mastered system area (MSA) 104 that stores file system objects relating to mastered content stored in mastered area 106. Mastered system area 104 stores, for example, directory information, file attributes, file size and other file system information concerning the data stored in mastered area 106. File system objects are written in MSA 104 from the outer diameter (OD) towards the inner diameter (ID) of storage disk 10. Mastered area 106 also stores mastered content from the OD towards the ID of storage disk 10. The mastered content is stored in data blocks which may be, for example, 16K bytes in size.

In some embodiments, a duplicate of MSA 104 is created adjacent to the inward edge of mastered area 106. The duplicate MSA is used if the first MSA is not readable for any reason.

The data in mastered areas 104 and 106 is formed by an embossing process in conjunction with the manufacture of storage disk 10 and consists of a spiral track of pits or bumps. The processes used to form mastered disks (e.g., Compact Discs) are well known.

Storage disk 10 also includes a buffer and writeable calibration area 108, which separates the mastered area 106 from a writeable area 12 (described below). The buffer area can include, for example, one track of mastered sectors and three grooved tracks that are used for servo focus and tracking calibration in preparation for reading or writing data in writeable area 12. The writeable calibration area is used to calibrate the read and write channel in writeable area 12. This is required, for example, because the reflectivity of the reflective layer in the pits or bumps of the master area is different from the reflectivity in the crystalline "pits" in the writeable areas.

In contrast to the mastered areas, in writeable area 12 no data (pits or bumps) is written at the time the disk is manufactured. Instead, the spiral track takes the form of a groove or "land" (the area between grooves) which is used by a servo system to assure that the read/write head tracks properly as the data is being written or read back. The servo systems used to provide tracking are widely known in the field. The groove is typically formed in a wobble that generates a sinusoidal signal used to control the rotational speed of the disk and to generate a clock signal. (See, e.g., U.S. Pat. Nos. 4,972,410 and 5,682,365 to Carasso et al.) Writeable area 12 has an inner boundary 12A and an outer boundary 12B. The groove may also contain high-frequency wobble marks which indicate the addresses of the physical sectors in writeable area 12, as described in the above-referenced application Ser. No. 09/542,681.

Writeable area 12 is a "write once read many" (WORM) data zone, meaning that data written in area 12 cannot be erased or moved but can be read many times. When storage disk 10 is manufactured, and before any data is written to it, writeable area 12 is a single homogeneous area having a spiral groove as described above.

Inward from writeable area 12 is a second buffer area 125, which has the same function as buffer area in buffer and writeable calibration area 108. Next comes a disk system area 126, which is a duplicate of DSA 102 at the OD of disk 10 and is used as a backup in case DSA 102, which can be very small, cannot be read. At the ID of disk 10 is a lead-out and disk format information area 128. The lead-out area ends at the maximum stroke of the optical pick up unit that is used to read and write data on disk 10. The disk format information area is in the form of a bar code and contains basic information about the disk, such as whether it is a first, second, etc., generation disk. By reading the disk information format area, the drive can quickly determine whether the disk is one that the drive is capable of reading. For example, if a second generation disk is inserted into a first generation drive, the drive would be able to tell immediately that it cannot read the disk.

To summarize, disk 10 contains two basic areas: the mastered areas, which include areas 102, 104, 106, 108, 125, 126 and 128; and the writeable area 12. The mastered areas contain a spiral track of pits or bumps that are embossed onto the disk during manufacture, the pits or bumps being separated by spaces; immediately following manufacture, the writeable area contains only a spiral groove, which is also embossed onto the disk. The mastered areas do not need to contain a groove because the track of embossed pits or bumps can be used by the read head for tracking purposes. In the writeable areas, the spiral groove (or the lands between the turns of the groove) provides a tracking signal during the reading or writing of information. In the embodiment described, the digital information in the writeable area consists of crystalline "bits" in the otherwise amorphous active layer. The crystalline bits, which are analogous to the pits in the mastered areas, may be formed either at the bottom of the groove or on the lands.

Figure 2:
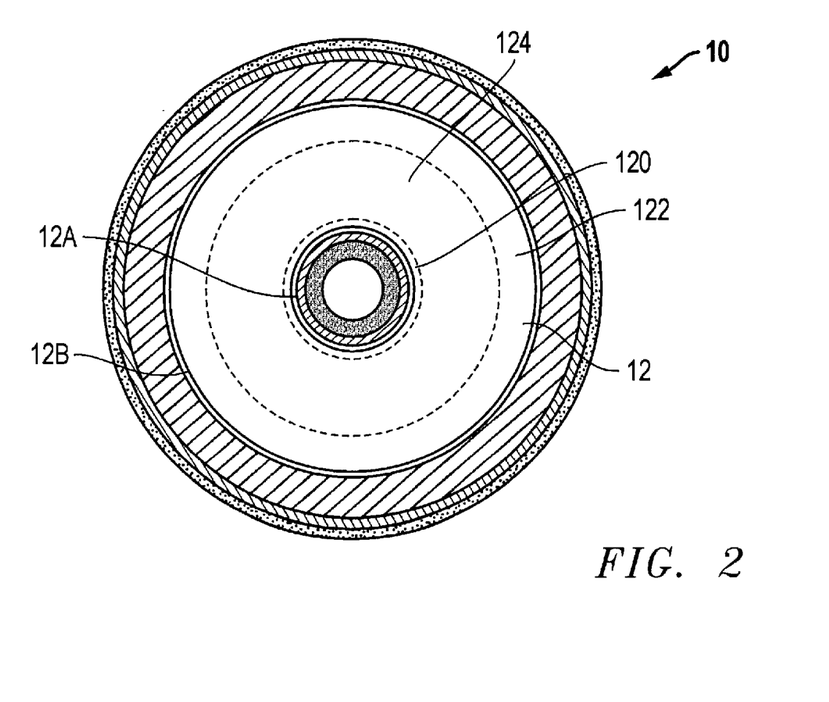
FIG. 2 show the locations of the writeable system area and the writeable data area on the disk.

In accordance with this invention, data is written into writeable area 12 as shown in FIG. 2. As data is written in writeable area 12, a writeable system area (WSA) 120 adjacent inner boundary 12A and a writeable data area (WDA) 122 adjacent outer boundary 12B are formed. Writeable system area 120 and writeable data area 122 are shown by the dashed lines in FIG. 2. When writeable area 12 is partially full, a blank region 124 separates writeable system area 120 and writeable data area 122.

Information is stored in writeable system area 120 in data files, every data file having "attributes" such as the type of file, file location, file size and file data type. Writeable system area 120 stores such file attributes as file system objects.

Using this format, the data files are written in writeable data area 122 from the OD towards the ID of writeable area 12, i.e., in a direction inward from the outer boundary 12B. The file system objects are stored in writeable system area 120 such that writeable system area 120 grows outwards from the ID towards the OD of writeable area 12. Each new sector of data is written on the spiral track in a direction towards the ID of disk 10, but the new sector is appended to the OD side of the last sector written in writeable system area 120. Hence, writeable system area 120 grows outwards from the ID towards the OD of writeable area 12, while writeable data area 122 grows inwards from the OD towards the ID of writeable area 12. As this happens, blank region 124 shrinks in size.

Figure 3A:
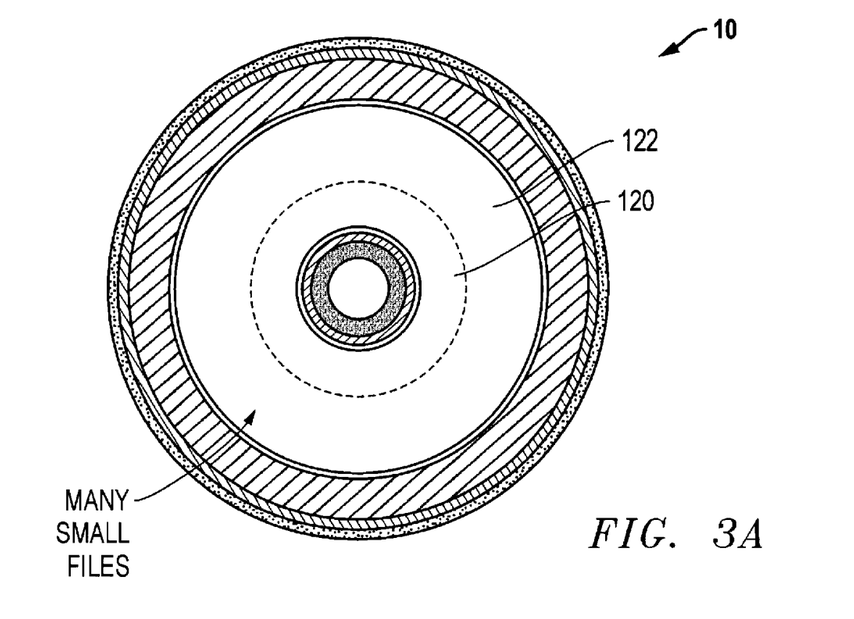
FIGS. 3A and 3B illustrate how the merger point of the writeable system area and the writeable data area can vary with the size of the data files stored on the disk.
Figure 3B:
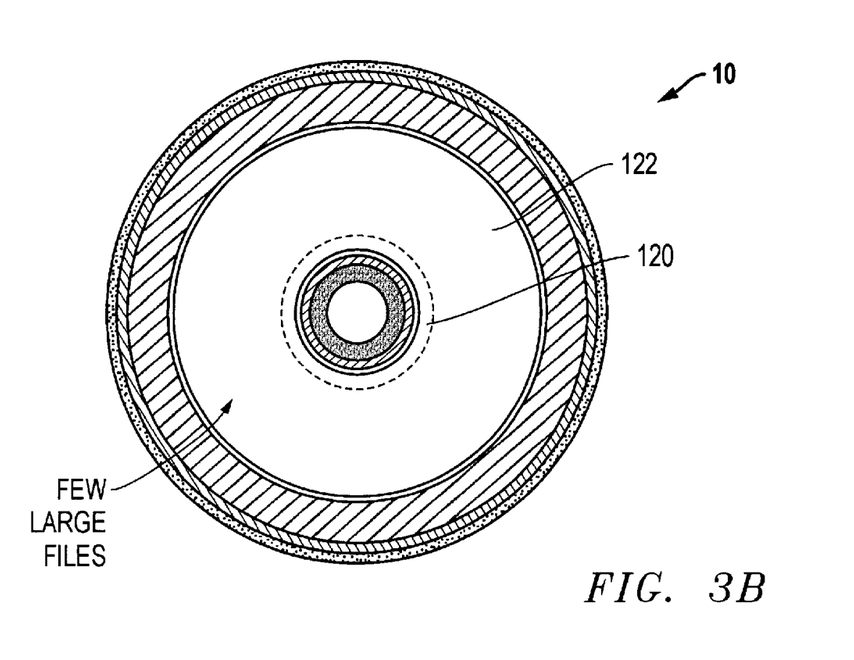

Ultimately, if data files continue to be written to disk 10, writeable system area 120 and writeable data area 122 will merge, and blank region 124 will disappear. The merger will occur at a location that is dependent upon the size of the data files written writeable data area 122. As shown in FIGS. 3A and 3B, if numerous small data files are written in writeable data area 122, the merger will occur further away from inner boundary 12A than if a few large files are written in writeable data area 122.

For example, if a data file is 100MB in size, then a large area is required for content while a smaller area may be required for the file system information. However if there are 20 files 5MB each, then the file system data files are likely to require a larger memory storage space for storing the file system data compared to the file system data for the 100MB file. Since the areas for data files and file system information approach each other, the respective sizes of writeable system area 120 and writeable data area 122 vary to meet the needs of the particular situation. Hence, the foregoing format according to the present invention apportions the data files and file system information in writeable area 12 such that writeable area 12 as a whole is efficiently utilized.

Figure 4A:
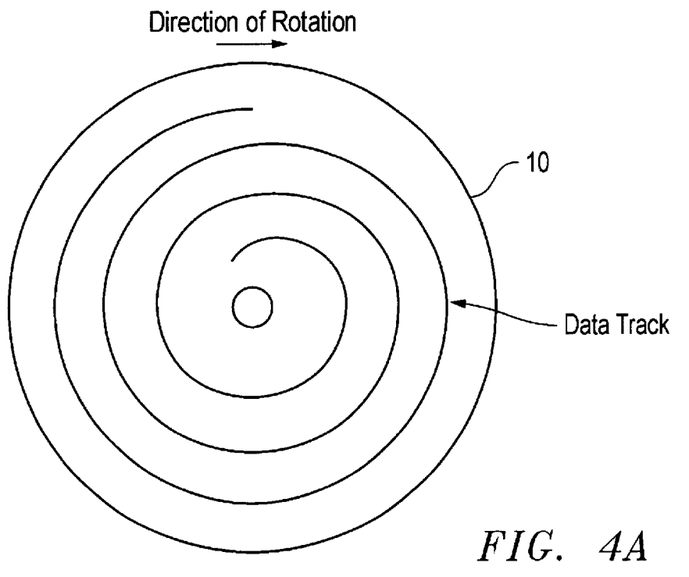
FIGS. 4A and 4B illustrate how the disk may be rotated either clockwise or counterclockwise.
Figure 4B:
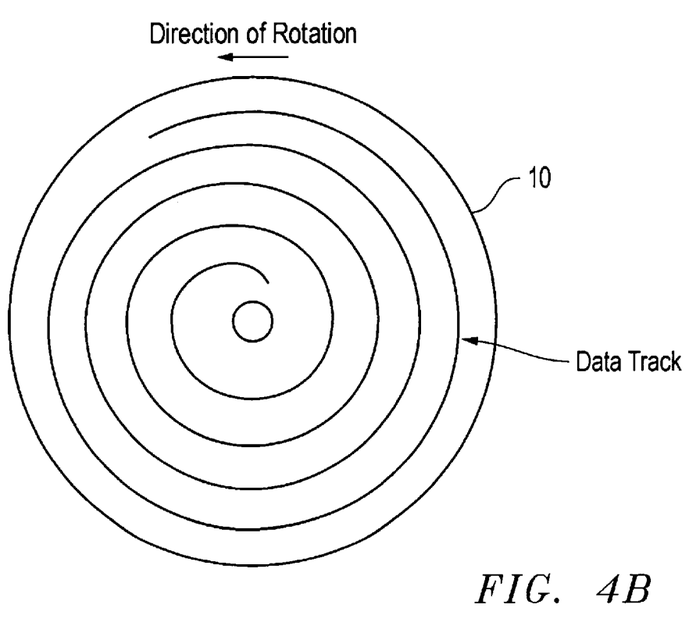

As noted above, the data stored on disk 10 is written and read in an inward direction, i.e., in a direction from the OD to the ID of disk 10. As shown in FIGS. 4A and 4B, using a spiral track, this can be with by rotating the disk in either a clockwise direction (FIG. 4A) or a counterclockwise direction (FIG. 4B). Obviously, the pitch of the track in FIGS. 4A and 4B is greatly exaggerated to illustrate the point.

Figure 5:
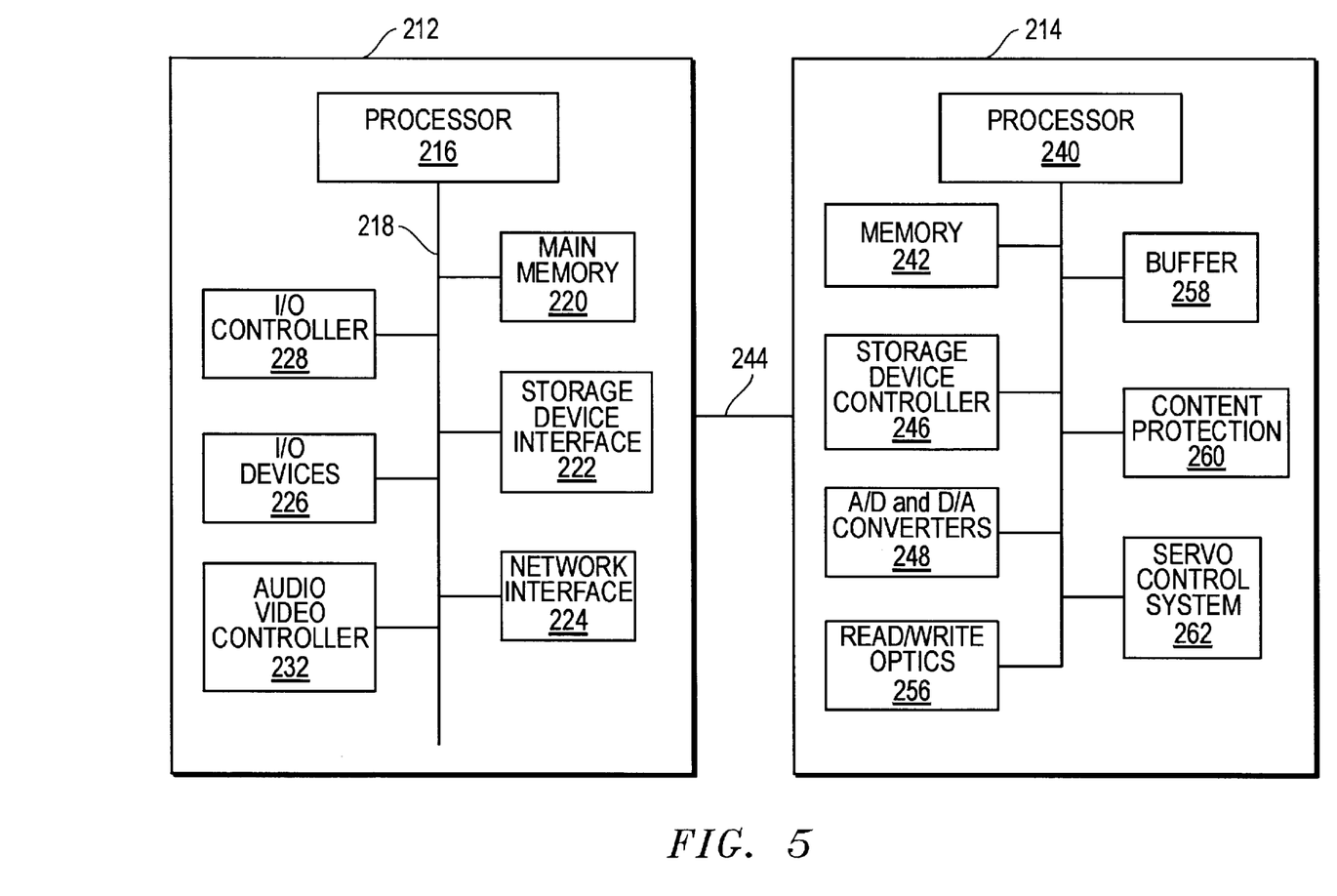
FIG. 5 is a block diagram of a host device and a disk drive that is usable with a disk recorded in the format of this invention.

Disks formatted in accordance with this invention can be written to and read from using a wide variety of disk drives, and the disk drives can be coupled to a variety of host devices. FIG. 5 illustrates the components of one possible combination of a host device 212 and a drive 214 with which a disk of this invention may be utilized. In host device 212, one or more processors 216 are connected by a host bus 218 to a main memory 220, a storage device interface 222, a network interface 224, and input/output (I/O) devices 226, connected via an I/O controller 228. Those skilled in the art will appreciate that host device 212 encompasses a variety of devices and systems that are capable of processing information in digital format including, for example, televisions, stereo systems, handheld audio and video players, portable computers, digital cameras, personal digital assistants, and other devices that include information processing and/or networking components.

Information may be downloaded from a source, such as the Internet, using one type of host device 212. A disk containing the downloaded information may then be used with other types of host devices 212. Accordingly, host device 212 includes the appropriate hardware and software components to transfer, encrypt/decrypt, compress/decompress, receive, record, and/or playback audio, video, and/or textual data, depending on the functionality included in host device 212. Such components may include audio and video controllers 232, as well as other devices not shown such as display devices, audio devices, keyboards, mouse-type input devices, modems, facsimile devices, televisions, voice recognition devices, electronic pen devices, and other types of mass storage devices 214 such as tape drives, floppy and hard disk drives, and write once read many (WORM) devices-including DVD-R drives and CD-R drives.

Disk drive 214 includes a processor 240 coupled to a memory 242 which may be one or a combination of several types of memory devices including static random access memory (SRAM), flash memory, or dynamic random access memory (DRAM). Disk drive 214 is coupled to host device 212 via a data bus 244. A storage device controller 246 receives input data from host device 212 and transfers output data to host device 212. Processor 240 includes operating system instructions to control the flow of data in disk drive 214.

The data may be converted from analog to digital format, or from digital to analog format, in converters 248. For example, analog data signals from the read portion of read/write optics 256 are converted to a digital signal for input to processor 240. Likewise, digital data from processor 240 is converted from digital to analog signals in converter 248 for input to read/write optics 256. Data may also be placed in buffer 258 for temporary storage until requested by host processor 240 or controller 246.

Content protection module 260 encrypts and decrypts the data, using one of several encryption or security schemes known in the art. Servo control system 262 provides control signals for actuators, focus, and spin drivers that control movement of the storage medium (not shown).

Those skilled in the art will recognize that the foregoing components and devices are used as examples for sake of conceptual clarity and that various configuration modifications are common. For example, although host device 212 is shown to contain only a single main processor 216, those skilled in the art will appreciate that the present invention may be practiced using a computer system that has multiple processors. In addition, the interfaces that are used in the preferred embodiment may include separate, fully programmed microprocessors that are used to off-load computationally intensive processing from processor 216, or may include input/output (I/O) adapters to perform similar functions. In general, use of any specific example herein is also intended to be representative of its class and the non-inclusion of such specific devices in the foregoing list should not be taken as indicating that limitation is desired.

Figure 6:
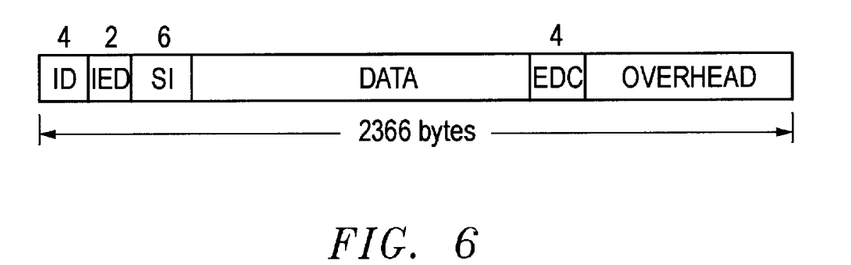
FIG. 6 is a diagram of the content of a physical sector on a disk formatted in accordance with this invention.

Data is stored in writeable area 12 in physical sectors which are numbered consecutively from the lead-in area at the OD of disk 10. The physical sectors are the basic physical unit in which the data is stored, i.e., anytime data is written to disk 10 at least one physical sector is created although it may be only partially filled with data. FIG. 6 shows how the physical sectors in disk 10 are organized. Each sector is 2366 bytes long and includes an ID field (4 bytes), and ID error detection (IED) field (2 bytes), a sector information (SI) field (6 bytes), a data field, an error detection (EDC) field (4 bytes), and an overhead field which includes parity bytes for use in an error correction code. The number of bytes in the data and overhead fields is variable in this embodiment, as described below. The ID field includes 3 bytes for designating the physical sector number; the ID field also contains one bit that indicates whether the sector is in a mastered area and a second bit that indicates whether the sector is located in a lead-in area.

The following is a description of a process of reading data from disk 10.

When data is to be read from disk 10, the disk system area 102 is read first. Disk system area 102 is small and thus a single scratch or other physical defect on the disk may make it difficult to read. In that event, as described above, the read/write head is instructed to proceed to disk system area 126, which is a duplicate of disk system area 102. (The provision of a duplicate disk system area is, of course, optional.)

Assuming that data is to be read from writeable data area 122, the read/write head then finds the most recent file system object written in writeable system area 120 (FIG. 2). The object is written in the outermost sector of area 120. Since memory 242 and buffer 258 are volatile memories, when the disk drive is initially turned on there is no record of where the that sector is located. Therefore, the most recent file system object written in writeable system area 120 must be found by using a binary search algorithm that is resident in processor 240.

Figure 7:
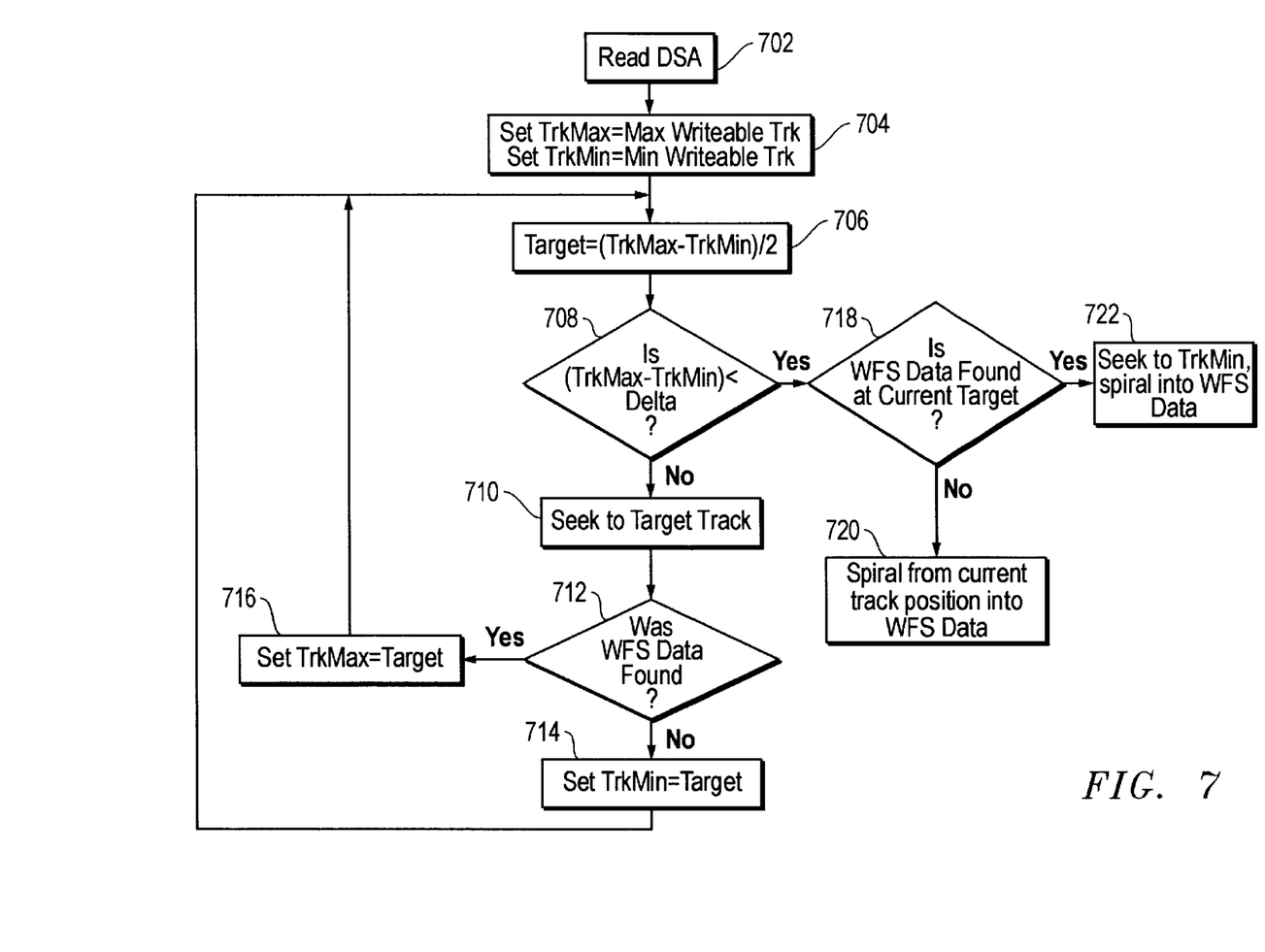
FIG. 7 is a flow chart of a binary search algorithm for finding the most recent object in the file system zone of the writeable area.

FIG. 7 illustrates a flow chart of one possible binary search algorithm. In step 702, disk drive 214 reads disk system area 102 to obtain the initial parameters for reading or writing data and layout information concerning disk 10. In step 704, the two variables TrkMax and TrkMin are set. TrkMax is set to the location of the maximum writeable track, at the inner boundary 12A of writeable area 12; TrkMin is set to the minimum writeable track, at the outer boundary 12B of writeable area 12. As is customary, one of the memories contains a lookup table that maps the physical sector numbers to the track numbers. Since the numbers of the outermost and innermost sectors in writeable area 12 are known, the numbers of the maximum and minimum writeable tracks are found using the lookup table.

In step 706, the program calculates the value Target as essentially the mean between TrkMax and TrkMin; and in step 708 the program determines whether the difference between TrkMax and TrkMin is less that a specified value Delta, which as described below defines when the storage device will begin spiraling inward along the track. If TrkMax minus TrkMin is not less than Delta, in step 710 the head is moved to the value of Target as determined in step 706.

At this point, it is determined whether the Target location is in writeable system area 120, i.e., whether it contains writeable file system (WFS) data (step 712). Since the WFS data is located in writeable system area 120, on the ID side of writeable area 12, if the Target location does not contain WFS data, the head needs to move inwards towards the ID of disk 10. This is done by setting TrkMin equal to Target (step 714). Conversely, if the Target location contains WFS data, the head needs to move towards the OD of disk 10; this is done by setting TrkMax equal to Target (step 716). The drive can determine whether it is in writeable system area 12 by reading the ID fields of the physical sectors. As described below, the ID fields of the physical sectors in the writeable system area 120 each contain a "system sector" bit. Writeable system area 120 is the only area of disk 10 that contains only "system sectors". Thus, by reading a succession of several ID fields it can readily be determined whether the head is in writeable system area 120.

The program continues to recycle through the loop containing steps 706, 708, 710, 712, and 714 or 716 until the difference between TrkMax and TrkMin is determined to be less than Delta (step 708), meaning that the head is within the predetermined distance of the most recent file system object.

Next, in step 718, it is determined whether WFS data is present at the current Target location. If not, this means that the head is located towards the OD from the most recent file system object, and the head follows the spiral track towards the ID until it reaches the most recent file system object (step 720). If WFS data is detected at the Target location, this means that the head is located towards the ID from the most recent file system object. Therefore, the head moves to the current value of TrkMin and then follows the spiral track towards the ID until it reaches the physical sector which contains the most recent WFS data (step 722).

Once the outermost edge of writeable system area 120 has been located, the head reads through area 120 from OD to ID until in reaches the information necessary to access the data files within writeable data area 122 that are to be read. Additional information concerning the arrangement of information in writeable system area 120 is provided in the above-referenced application Ser. No. 09/583,133. The location of the most recent WFS data is stored in the buffer memory for future use, thereby eliminating the need to perform the binary search algorithm again while the disk drive is turned on.

If the data to be read is in the mastered area 106, after reading the disk system area 102 (or alternatively disk system area 126) the read/write head is instructed to proceed to mastered system area 104. The head then reads mastered system area 104 in a conventional manner to locate the system information concerning the sought-after data in mastered area 106.

The following is a description of a process of writing data on disk 10.

As with the read process, the disk system area 102 (or 126) is read first. Assuming that disk drive has just been turned on, the same binary search algorithm described above and in FIG. 7 is used to locate the outermost (i.e., most recently recorded) physical sector in writeable system area 120. Then the head is instructed to record the writeable file system data for the to-be-recorded data at the adjacent physical sector. For example, if the most recently recorded system information is at physical sector number 1000, the head will be instructed to go to physical sector number 999 to write the new writeable file system data. In one embodiment the sector addresses are recorded in the high-frequency wobble marks (HFWMs), as described in the above-referenced application Ser. No. 09/542,681.

Next, the head is directed to the physical sector that is adjacent to the most recently recorded data in writeable data area 122. As described, above this sector is located adjacent the ID edge of writeable area 122. Initially, the head must write a linking sector to provide timing information for the head during read, i.e., the linking sector separates the most recently recorded data and the data to be recorded. After the linking sector has been written the data is written in a conventional manner, except that the head is moving towards the ID of disk 10.

The embodiment described above can be varied in numerous ways without departing from the scope of this invention. For example, while data is written and read from the OD to the ID of the disk, in other embodiments the data may be read from the ID to the OD of the disk. In some embodiments, the writeable system area may be located radially outward from the writeable data area. Neither the writeable system area nor the writeable data area needs to be located at the inside or outside boundary of the writeable area. The principles of this invention include any arrangement in which a writeable area of a data disk includes a first annular zone of recorded data separated from a second annular zone of recorded data by a blank writeable area, and wherein additional data is written at an outside boundary of the first zone and an inside boundary of the second zone such that the zones expand in size and blank writeable area between the zones decreases in size.

Optical data is typically recorded in units referred to as data blocks or Error Correction Code (ECC) blocks, each of which typically contains an amount of data equal to a multiple of the amount of data in a single physical sector. For example, in the DVD-R environment each ECC block contains a total of 38.688K bytes or 32K bytes of user data. All user data written to a DVD disk must be contained in ECC blocks of 32K bytes. For example, if 31K bytes of user data are to be written, one ECC block is required; if 33K bytes are to be written, two ECC blocks are required. The ECC block used in the DVD-R system is described fully in Standard ECMA-279 (December 1998), which is incorporated herein by reference in its entirety and referred to hereinafter as the "DVD-R standard".

(Note: ECC blocks are to be distinguished from the physical sectors in which the data is stored on the disk. Each ECC block typically contains data from a fixed number of physical sectors which the hardware then scrambles and assembles into an ECC block for purposes of error correction. In addition, the hardware adds sync codes into each data block. These techniques are well-known and are described for example in the DVD-R standard. As used herein, the term "ECC block" refers to a quantity of data stored on the disk that is used to assemble a single ECC block.)

This system is very wasteful because many groups of data occupy far less than 32K bytes. One example is the linking sector which must be recorded between data written at different sessions. Even though the timing data in a linking sector occupies far less than 32K bytes, in the DVD-R environment 32K bytes of storage space must be used up every time a linking sector is recorded.

To overcome this problem, disk drive 214 allows data to be written in Error Correction Code (ECC) blocks of different sizes. Storage device controller 246 supports two modes of saving data on the media: (i) the User Data Mode and (ii) the System Data Mode. Each of these modes requires a different size of ECC block. The first mode is the most efficient storage mode for large data files and is used to store user data files or pre-mastered content. The second mode is used to store small amounts of internal system information and is designed to support small blocks of data.

The User Data Mode requires that the length of each file be a multiple of eight physical sectors on disk 10. Each physical sector can store 2048 user data bytes, so this mode requires the file size to be a multiple of 16,384 bytes. If the user file is not a multiple of this size, the file size must be rounded up to the next multiple. This process is accomplished within the file operating system contained within the device. This eight-sector entity is called a "data ECC block".

The System Data Mode requires that the length of each file be one physical sector on disk 10. In this mode, more of the physical sector may be assigned to ECC parity bytes in order to recover the system data reliably. So, in this mode, the physical sector can store only 1528 system data bytes. This single sector entity is called a "system ECC block".

Figure 8:
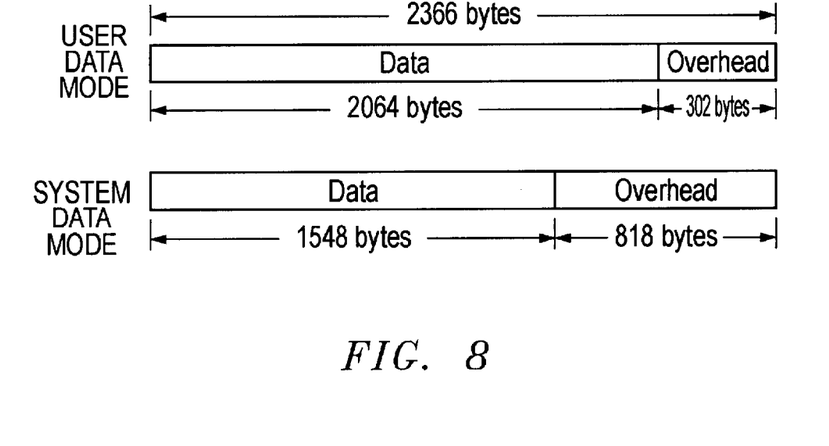
FIG. 8 is a diagram of a first physical sector arranged in the User Data Mode and a second physical sector arranged in the System Data Mode.

FIG. 8 shows diagrams of two physical sectors, one in the User Data Mode and the other in the System Data Mode. In each physical sector, the data portion includes the ID, IED, SI and EDC fields shown in FIG. 6. Since these fields occupy a total of 16 bytes, the actual "user data" in the sector equals 2048 bytes in the User Data Mode and 1532 bytes in the System Data Mode. The total number of bytes in the physical sector (2366) does not change between the two modes.

In the User Data Mode, the data in eight physical sectors is assembled, in a manner similar to that described in the DVD-R standard, into a "data ECC block" of 18,928 bytes (2366×8), which includes 16,512 bytes (2064×8) of data and 2416 overhead bytes (302×8) most of which are used to construct the inner and outer parity codes of the ECC block. In the System Data Mode, the data in a single physical sector is used to form a "system ECC block" of 2366 bytes, which includes 1548 bytes of data and 818 overhead bytes for use in constructing the parity codes. The ratio of overhead bytes to data bytes is greater in the System Data Mode than in the User Data Mode because the system ECC block contains only 2366 bytes instead of 18,928 bytes. The smaller ECC block requires a more robust error correction capability, which is reflected in the higher proportion of overhead bytes.

Figure 9:
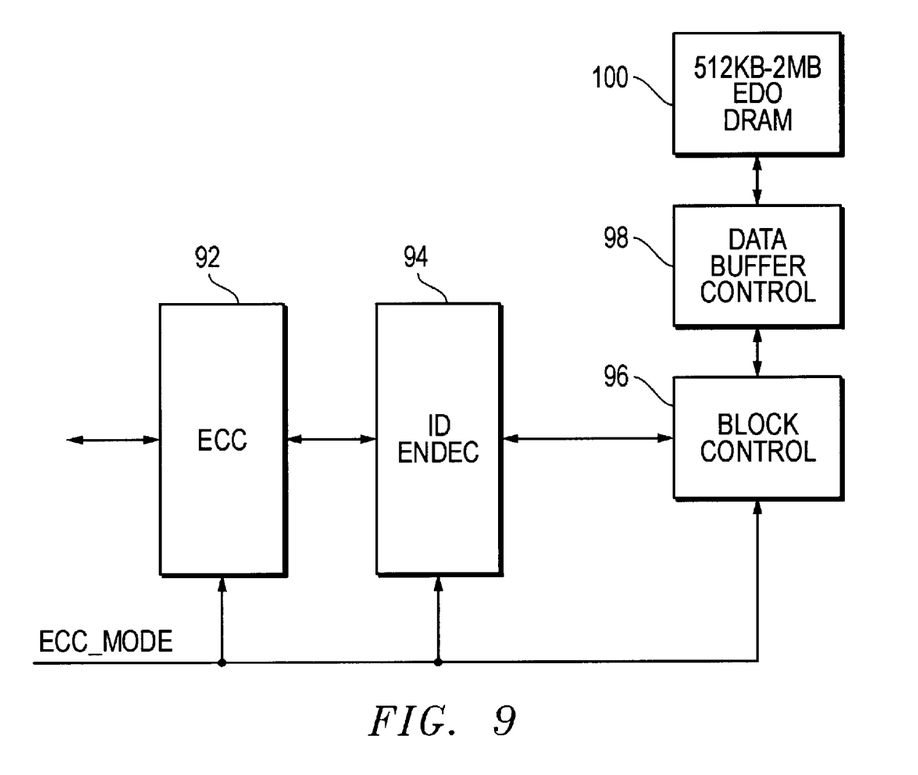
FIG. 9 is a block diagram of the hardware that controls whether the storage device is in the User Data Mode or a System Data Mode.

The two modes are implemented in storage device controller 246 and are denoted by a signal designated ECC_MODE (see FIG. 9). When ECC_MODE is a logic 0, the hardware is in the data ECC block mode. When ECC_MODE is a logic 1, the hardware is in the system ECC block mode. The system detects when less than 2048 bytes of data are to be written and generates a logic 1 ECC_MODE signal; if more than 2048 bytes are to be written, the system generates a logic 0 ECC_MODE signal. In the hardware block diagram of FIG. 9, the ECC MODE signal is received by the ECC logic 92 and informs logic 92 how to encode or decode the data passing through it. ID EnDec logic 94 uses the ECC_MODE signal to determine where to insert the various overhead bytes used to control the storage of physical sectors on the media. Some of the bytes are inserted ahead of the information bytes and some are inserted behind the information bytes, so the information byte field length must be known by ID EnDec logic 94.

Block control logic 96 receives the ECC_MODE signal which tells it how much information to send or receive from data buffer control 98 to equate to a physical sector. In a system ECC block, the information field is 1528 bytes in length. The remaining 20 bytes needed to fill up the 1548 bytes contained in a physical sector in this mode are provided by ID EnDec logic 94. In a data ECC block, the information field is 2048 bytes in length. The remaining 16 bytes needed to comprise the 2064 byte data field of a data ECC block are provided by ID EnDec logic 94.

To summarize, disk drive 214 contains two sets of hardware, one capable of generating ECC blocks using the data in eight physical sectors, the other capable of generating ECC blocks using the data in a single physical sector. The ECC_MODE signal effectively selects one or the other hardware set, depending on whether the "block" of data to be written (to be distinguished from an "ECC block") is greater than 2048 bytes in length. The system also inserts a bit in the ID field of each physical sector indicating whether the data is in the User Data Mode or System Data Mode (a "0" indicates that the sector is recorded as a single ECC block; a "1" indicates that the sector is part of an eight-sector ECC block). Thus, when the data is read, the system can tell whether it should be processed as single-sector or eight-sector ECC blocks. As stated above, the actual processing of the data in ECC blocks is well-known in the art and is described, for example, in the DVD-R standard (see Section 4).

As described above, data files written to a disk are normally separated by what are called "linking sectors" which contain timing information. The linking sectors typically contain far fewer bytes of information than the data blocks, but with conventional systems the linking sectors must be the same size as the data blocks. Current optical storage devices use a 32K byte-block size for the linking sectors. Hence memory space is wasted in conventional systems.

Figure 10:
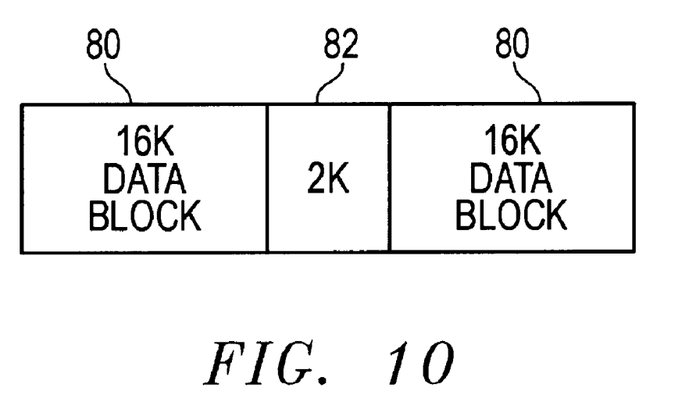
FIG. 10 illustrates sizes of a 2K linking block located between two 16K data blocks according to the present invention.

FIG. 10 shows an embodiment in accordance with the invention, wherein two 16K data blocks 80 are separated by a 2K linking sector 82. This arrangement saves 14K of storage space as compared with prior art systems, where the linking sector 82 would have to be the same size as the data blocks 80. As another example, since the writeable file system objects in writeable system area 120 are typically smaller than the files in writeable data area 122 the smaller block size can be used in writeable system area 120 and the larger block size can be used in writeable data area 122 (FIG. 2).

Embodiments in accordance with this invention have numerous advantages in comparison with prior art data storage disks.

A major advantage of the present invention is that the writeable area can be apportioned between the system area and the data area in the optimal manner.

Another key advantage is that data can be written in plural ECC block sizes rather than the fixed ECC block sizes of conventional systems, thereby avoiding the waste of storage space when a small block of data is to be recorded.

The format also saves disk drive power. As discussed above, in conventional systems data is written and read from ID to OD. Since a higher rotational speed is required to read data near to the ID, more power is required to start reading data in conventional systems, and more time is required to access the stored data. With disks recorded in the format of this invention, reading and writing takes place on average closer to the OD and therefore the rotational speed and power are lower during continuous operation. The power-saving aspect of the present invention can be used to advantage particularly in portable devices such as audio players and digital cameras.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims. The broad principles of this invention are applicable to any type of data storage disk, whether the disk be optical, magnetic-optic or magnetic, regardless whether the data is stored on one or both sides of the disk, and regardless of whether the disk has both writeable and mastered areas or only writeable areas.

We claim:

1. A data storage disk comprising:
   a writeable area having a servo track, the writeable area including:
      a writeable system area formed beginning adjacent to an inner boundary of the writeable area out toward the outer boundary of the writeable area as data is written to said writeable area;
      a writeable data area formed beginning adjacent an outer boundary of the writeable area in toward the inner boundary of the writeable area as data is written to said writeable area, the writeable system area containing attributes of data stored in the writeable data area; and
      a blank region separating the writeable system area and the writeable data area, said blank region decreasing in size as said data is written to said writeable area.

2. The data storage disk of claim 1 wherein the writeable system area contains data written in error correction code (ECC) blocks of a first size and the writeable data area contains data written in ECC blocks of a second size, the first size being smaller than the second size.

3. The data storage disk of claim 2 wherein the first size is 2K bytes and the second size is 16K bytes.

4. The data storage disk of claim 1 wherein the disk is an optical storage disk.

5. A data storage disk comprising:
   a writeable area, including:
      a first portion configured to include a first group of error correction code (ECC) blocks of a first size;
      a second portion configured to include a second group of ECC blocks of a second size; and
      a blank region separating the first portion and the second portion, said blank region decreasing in size as said ECC blocks of each size is written to said writeable area.

6. The data storage disk of claim 5 wherein the first group of ECC blocks contain file system information and the second group of ECC blocks contain data, the file system information representing attributes of the data, the ECC blocks in the first group being smaller than the ECC blocks in the second group.

7. The data storage disk of claim 5 wherein the first group of ECC blocks comprise linking sectors.

8. A method of writing data on a disk comprising:
   providing a data storage disk having a writeable area including a writeable system area and a writeable data area, the writeable data area being located radially outward from the writeable system area, the writeable system area and the writeable data area being separated by a blank region;
   writing file system information in a first portion of the blank region located adjacent the writeable system area; and
   writing a data file in a second portion of the blank region located adjacent the writeable data area,
   said writing file system information in a first portion of the blank region and writing a data file in a second portion of the blank region causing the blank region to decrease in size until the first and second portions substantially meet.

9. The method of claim 8 wherein the file system information contains an attribute of the data file.

10. The method of claim 8 comprising writing additional file system information adjacent the file system information and writing an additional data file adjacent the information file.

11. The method of claim 10 wherein the additional file system information contains an attribute of the additional data file.

12. A method of writing data on a data storage disk, comprising:

providing a data storage disk having a writeable area including a first annular region of recorded information and a second annular region of recorded information, the second annular region being located radially outward from the first annular region and being separated from the first annular region by an annular blank area;

reducing the size of the annular blank area by writing first information adjacent an outside edge of the first annular region; and writing second information on the inside edge of the second annular region.

13. A data storage disk comprising:

a writeable area including an unwritten servo track wherein a user may write data using a data storage device including a write head;

a mastered area containing data formed in conjunction with the manufacture of the disk; and a first buffer area separating the mastered area and the writeable area the mastered area located radially outside the writeable are, the first buffer area configured to decrease in size as data is written to said writeable area.

14. The data storage device of claim 13 further comprising a lead in system area that may include encrypted data to prevent unauthorized access to the data storage disk.

15. The data storage device of claim 13 further comprising a writeable calibration area that includes data for calibrating the writeable area.

16. The data storage device of claim 13 her comprising a format information area that may include format information regarding the data storage device.

17. The data storage device of claim 13 wherein a user may write content in plural data block sizes.

18. The data storage device of claim 17 wherein the data block sizes are greater than a link block size, wherein the link block is located between data blocks.

* * * * *